United States Patent [19]
Shimonaka et al.

[11] Patent Number: 6,020,585
[45] Date of Patent: Feb. 1, 2000

[54] OPTICAL ROTARY ENCODER HAVING AT LEAST ONE ZONE PLATE

[75] Inventors: Yuji Shimonaka, Habikino; Tatsuo Matsushima, Kitakatsuragi-gun; Yasuichi Fujimoto, Kashiwara, all of Japan

[73] Assignee: Koyo Seiko Co., Ltd., Osaka, Japan

[21] Appl. No.: 09/048,839

[22] Filed: Mar. 27, 1998

[30] Foreign Application Priority Data

Mar. 27, 1997 [JP] Japan ................................. 9-094563

[51] Int. Cl.[7] ....................................................... G01D 5/34
[52] U.S. Cl. ................................. 250/231.13; 250/237 R
[58] Field of Search ........................... 250/231.13, 231.14, 250/231.15, 237 G, 237 R; 359/565, 566, 724, 742; 356/374, 385, 386

[56] References Cited

U.S. PATENT DOCUMENTS 4,700,065  10/1987  Kordulla et al. ...................... 250/237 G
5,054,913  10/1991  Ishikawa et al. .................... 250/237 R
5,251,012  10/1993  Riegger et al. ........................ 356/374

FOREIGN PATENT DOCUMENTS 63-63919    3/1988   Japan .
05102528    4/1993   Japan .
7-58205     6/1995   Japan .
WO 88/08513 11/1988  WIPO .

OTHER PUBLICATIONS

Miyama, H. et al., "Optical Micro Encoder Using a Vertical–Cavity Surface–Emitting Laser", Sensors and Actuators A, vol. A57, No. 2, pp. 127–137, Nov. 1996.

Primary Examiner—Que T. Le
Attorney, Agent, or Firm—Thelen Reid & Priest

[57] ABSTRACT

In an optical rotary encoder, a stationary plate having a zone plate and a rotary slit plate having slits are interposed between a light source and a light receiving element. A suitable radius of the innermost circle of the zone plate is selected so that the zone platess provide a sufficient convergence of light for reduction of silt interval (hence for improvement of the detection precision) with a distance between the stationary plate and the rotary slit plate maintained at a value permitting the fabrication of the encoder.

4 Claims, 5 Drawing Sheets

OPTICAL ROTARY ENCODER HAVING AT LEAST ONE ZONE PLATE

FIELD OF THE INVENTION

The present invention generally relates to an optical rotary encoder.

DESCRIPTION OF THE PRIOR ART

FIG. 5 is a perspective view showing a construction of a typical optical rotary encoder conventionally used. Referring to the figure, the construction is made such that two members each having slits are interposed in an optical path between a light source 101 such as an LED (or laser diode) and a light receiving element 102. One of these members closer to the light source 101 is a rotary slit member 103 which is rotatable together with an object to be measured. The rotary slit member is adiskhavingmany slits 103a formed in the radial direction and circumferentially spaced at regular intervals. The other is a stationary slit member 104 fixed to a stationary portion (not shown) and formed with slits 104a arranged at the space intervals same as those in the rotary slit member 103.

The rotary slit member 103 is irradiated by a light beam, such as an LED light beam, emitted from the light source 101 disposed in front of the rotary slit member 103, and the light having passed through the slits 103a and 104a is detected by the light receiving element 102 disposed behind the stationary slit member 104. Accordingly, the light receiving element 102 detects light for each quantity of rotation of the rotary slit member 103 that corresponds to a slit interval Ls, thereby providing a pulse output. Thus, quantity of rotation can be detected by counting the pulse outputs. That is, detection precision of the light receiving element is determined by the number of pulse outputs per quantity of rotation, and therefore, the respective slit intervals Ls of the slits 103a and 104a must be reduced to improve the detection precision of the light receiving element 102.

However, if the slit interval Ls is to be decreased for improvement of the detection precision of the above-mentioned conventional optical rotary encoder, a distance d between the rotary slit member 103 and the stationary slit member 104 should be reduced in proportion to a value of the square of the slit interval Ls. Unfortunately, however, there is a limit to the reduction of the distance d in fabrication of the optical rotary encoder and hence, reduction of the slit interval Ls is also limited. This results in the limit to the improvement of the detection precision.

OBJECT AND SUMMARY OF THE INVENTION

In view of the foregoing, it is an object of the present invention to provide an optical rotary encoder designed to further increase the detection precision.

An optical rotary encoder of the present invention comprises:

- a light source;
- a stationary plate disposed perpendicular to an optical axis of light emitted from the light source, the stationary plate having at least one zone plate;
- a rotary slit plate which is rotatable and spaced from the stationary plate by a focal length of the zone plate in a direction of emission of the light, the rotary slit plate having slits arranged at predetermined space intervals along a circumference at a radius position of intersection with the optical axis; and
- a light receiving element disposed proximate to the rotary slit plate for detection of light passing through the slits.

The above-mentioned optical rotary encoder is adapted such that light converged by the zone plate is allowed to enter the slits so as to be detected by the light receiving element. Since the focal length of the zone plate is dependent upon a radius of a circle defining the innermost circumference of the zone plate, selection of a suitable radius of the circle permits the reduction of a beam radius close to a diffraction limit with the focal length of the zone plate or the distance between the stationary plate and rotary slit plate maintained to a degree such as to enable the fabrication of the optical rotary encoder. Thus, a notable reduction of the spacing between adjacent slits can be accomplished to drastically increase precision of the detection of quantity of rotation.

Further, the aforementioned rotary encoder may be constructed such that a plurality of zone plates are arranged in a direction that the slits are arranged while a distance between the centers of adjacent two of the zone plates is expressed as n·Ls with Ls representing an interval between adjacent slits and n indicating an integer. In that construction, existence of plural zone plates contributes to an increased sum of quantity of light passing therethrough, thus facilitating the detection by the light receiving element. Additionally, quantity of received light can be arbitrarily adjusted by changing the number of zone plates.

In the aforementioned rotary encoder, the zone plate may be a Fresnel zone plate in which a plurality of circular zones are concentrically formed. The Fresnel zone plate functions as lens, thereby to converge light into fine small beam spot. It is therefore easy to reduce the spacing between adjacent slits. Also, the zone plate may be a linear zone plate formed with linear zones extended in parallel with a longitudinal direction of the slit positioned on the optical axis of light from the light source. The linear zone plate converges the light into a linear form corresponding to the shape of the slit and therefore, even if the slit is displaced, at least a part of the linearly converged light is allowed to readily pass through the slit. This allows for the detection by the light receiving element and hence, stable detection is accomplished.

DESCRIPTION OF THE PREFERRED EMBODIMENTS

Hereafter, preferred embodiments of the present invention will be described with reference to the accompanying drawings.

Figure 1:
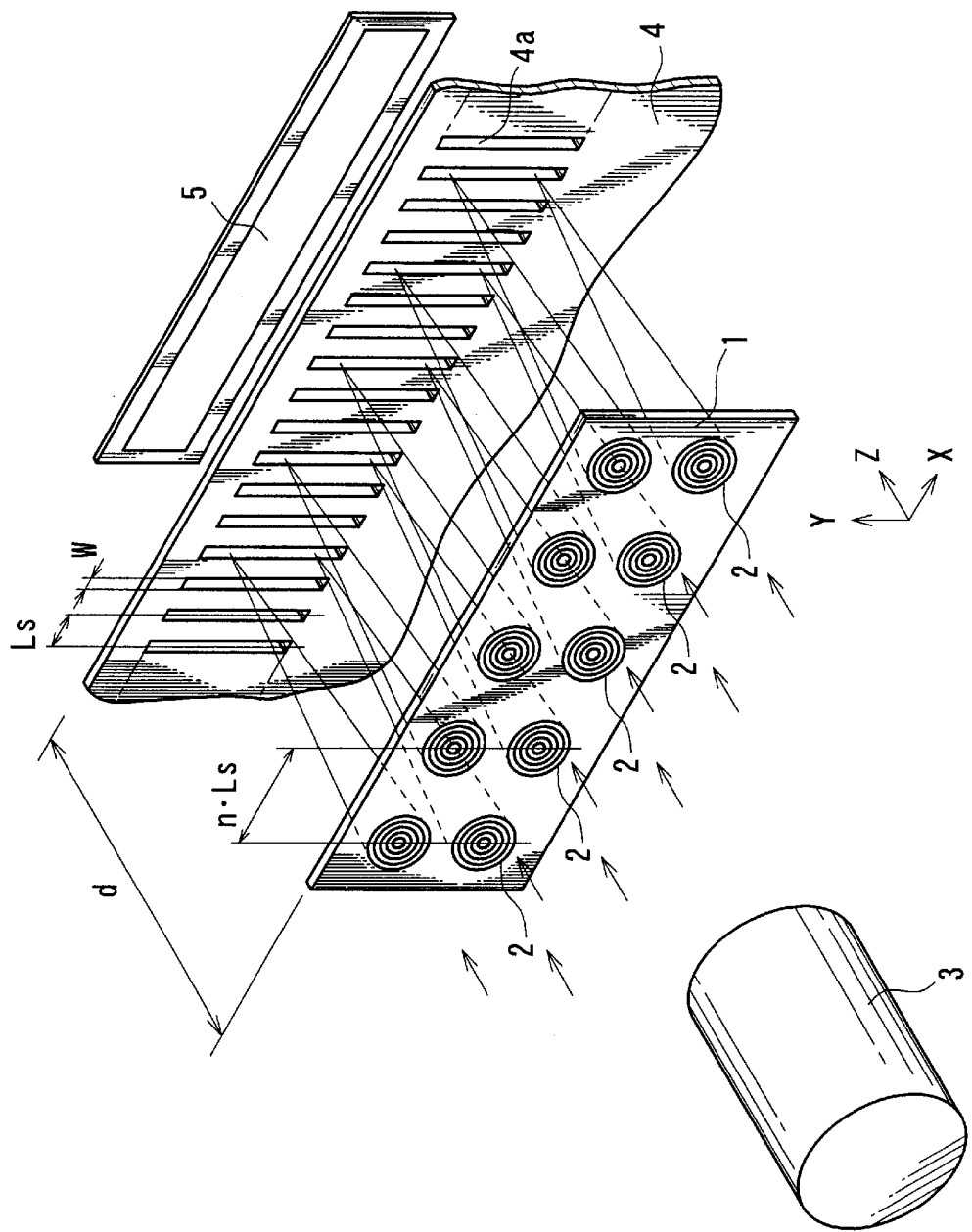
FIG. 1 is a perspective view showing a construction of an optical rotary encoder in a first embodiment of the present invention.
Figure 2:
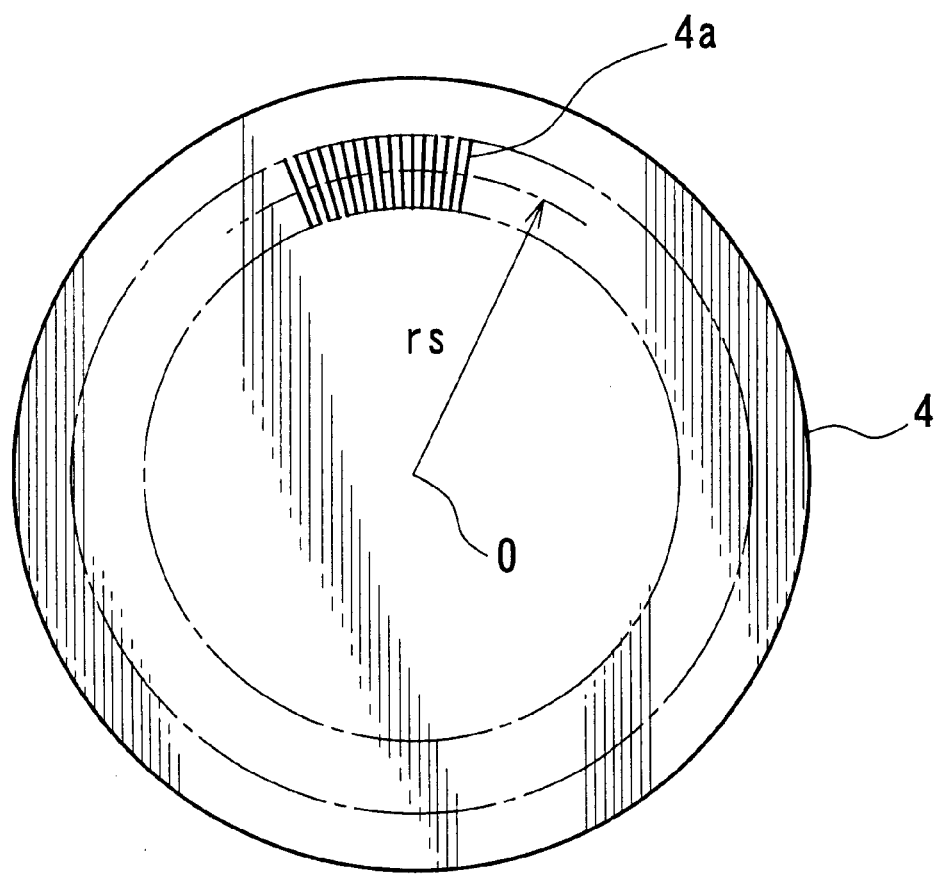
FIG. 2 is a front view showing the whole configuration of a rotary slit plate shown in FIG.1.

FIG. 1 is a perspective view on the x, y and z coordinates showing an essential portion of the construction of an optical rotary encoder in an embodiment of the present invention. The figure is depicted free from a proportional scale of the real length or size to more explicitly show the essential portion of the construction. Referring to the figure, a stationary plate 1 is fixedly disposed in parallel with an X-Y plane and formed with a plurality of zone plates 2 arranged at regular space intervals with respect to the X-direction. In this embodiment, the plural zone plates 2 are organized into two rows and five columns, and each of the zone plates 2 is a Fresnel zone plate in which plural circular zones are concentrically formed. A light source 3 composed of an LED or plural LEDs is so disposed as to establish an optical axis in the Z-direction perpendicular to the stationary plate 1 and emits light to the zone plates 2. Incidentally, there may be provided a plurality of light sources 3 in correspondence to the respective zone plates 2. A rotary slit plate 4 is rotatable together with an object for detection of quantity of rotation and disposed in parallel with the X-Y plane as spaced from the stationary plate 1 by a distance d in the Z-direction. The whole body of the rotary slit plate 4 is shaped like a disk, as shown in FIG. 2. The rotary slit plate 4 is so disposed as to intersect with the optical axis at a right angle at a position of radius rs from the center of rotation O thereof. The rotary slit plate 4 has a plurality of radial slits 4a arranged at regular space intervals Ls (FIG. 1) along a circumference of the radius rs. The respective pairs of zone plates 2 of each column are radially arranged in correspondence to the slits 4a, and therefore the respective five zone plates 2 of each row are aligned on an arc in the strict sense. A light receiving element 5 is disposed behind and proximate to the rotary slit plate 4 and extends in parallel with the X-Y plane.

It is to be noted that the space interval Ls (hereinafter is referred to as slit interval Ls) between adjacent slits 4a is extremely small as compared to the radius rs, and therefore, such a small number of slits 4a as shown in FIG. 1 may be regarded as aligned on a straight line. Accordingly, the zone plates 2 may be aligned on a straight line extended in the X-direction.

In the aforementioned construction, the slit interval Ls is given by the following expression with Ps denoting a number of pulses detected by the light receiving element 5 in one rotation of the rotary slit plate 4:

Ls=2π·rs/Ps.

A slit width W of the slit 4a, which is a half of the slit interval Ls, is given by the following expression:

W=π·rs/Ps.

The distance d between the stationary plate 1 and the rotary slit plate 4 with respect to the Z-direction, which is equivalent to a focal length of the zone plate 2, is given by the following expression:

d=(s1²)/λ, wherein s1 denotes a radius of the innermost circle of the zone plate 2 and λ denotes a wavelength of light from the LED.

In order to provide an optical system having a construction analogous to the prior-art rotary encoder, the zone plates 2 are arranged at given space intervals, each space interval being an integer multiple of the slit interval Ls. That is, a space interval between adjacent zone plates 2 is to be expressed as n·Ls. The minimum value of an integer n is given by the following expression:

$$n = \frac{PS\sqrt{\zeta_{max}\lambda d}}{\pi \cdot rs} + 1$$

,wherein $\zeta_{max}$ denotes the number of rings of the zone plate 2. When an integer n obtained by the above-mentioned expression is selected, the space interval between adjacent zone plates can be made minimum. Incidentally, a required number of zone plates 2 is determined by a relationship between a quantity of light passing through the slits 4a to be collected by the light receiving element 5 and the minimum sensitivity of the element.

A specific numerical example for the above-mentioned expression is given as below.

When the following values are given:
LED wavelength λ=0.74 μm,
number of pulses Ps=5000 pulse/rev,
focal length d=200 μm, and
radius rs=14 mm,
the following values are obtained:

$$s1 = \sqrt{0.74 \times 200} = 12.16 \; \mu m,$$

$$W = \pi \times (14/5000) = 8.8 \; \mu m,$$

$$Ls = 2\pi \times (14/5000) = 17.6 \; \mu m,$$

$$\rho 2 = \sqrt{2 \times 0.74 \times 200} = 17.2 \; \mu m,$$

$$\rho 3 = \sqrt{3 \times 0.74 \times 200} = 21.1 \; \mu m,$$

$$I_0 = 16 \times I_{00} \; (N = 3), \; \text{and}$$

$$n = 3$$

,wherein ρ2 denotes a second zone radius; ρ3 denotes a third zone radius; $I_0$ denotes a light intensity at a focus of the zone plate; $I_{00}$ denotes alight intensity at apoint corresponding to the focus of the zone plate where no zone plate exists; and N denotes a number of zones.

In the above-mentioned construction, when light is emitted from the light source 3 to a plurality of zone plates 2 aligned at regular space intervals, the zone plates 2 functioning as lenses converge the light into fine small beam spots aligned at regular space intervals. Since the space interval between adjacent fine small beam spots is an integer multiple (n·Ls) of the slit interval Ls, a process wherein all the beam spots are simultaneously allowed to pass through the slits 4a and thereafter interrupted is repeated in response to movement of the rotary slit plate 4. Based on the repetitions of this process, the light receiving element 5 outputs on-off (pulsed) signal corresponding to a quantity of rotation of the rotary slit plate 4.

Based on the expression d=(s1²)/λ, giving a focal length of the zone plate 2 which is equivalent to a distance between the stationary plate 1 and the rotary slit plate 4, an arbitrary distance d can be defined by changing the radius s1 of the innermost circle of the zone plate 2.

Further, it is known that the light beam can be converged by the zone plate 2 into a beam having a diameter close to the diffraction limit. Accordingly, the semiconductor patterning technology, such as lithography, may be utilized for improving the patterning precision of the zone plate 2 and producing a converged light having a beam spot of a predetermined minimum diameter, so that the slit interval Ls can be made as small as possible with the distance d between the stationary plate 1 and the rotary slit plate 4 maintained at an arbitrary value permitting the fabrication of the encoder.

In addition, by virtue of the zone plate 2 converging the LED light into a fine small spot, the on/off signal responding to the passage/interruption of the LED light through the slits 4a may have a greater S/N ratio. Furthermore, quantity of received light can be adjusted by changing the number of zone plates 2, the radius of a center circle of the zone plate 2 and the number of zones therein and hence, a greater degree of design freedom is offered.

Additionally, a known A/B two-phase output can readily be obtained by making patterns of the zone plate with the center thereof shifted by Ls/4.

It should be appreciated that the aforementioned embodiment is described by way of an example provided with a plurality of zone plates 2 but in principle, there may be provided one zone plate 2.

Figure 3:
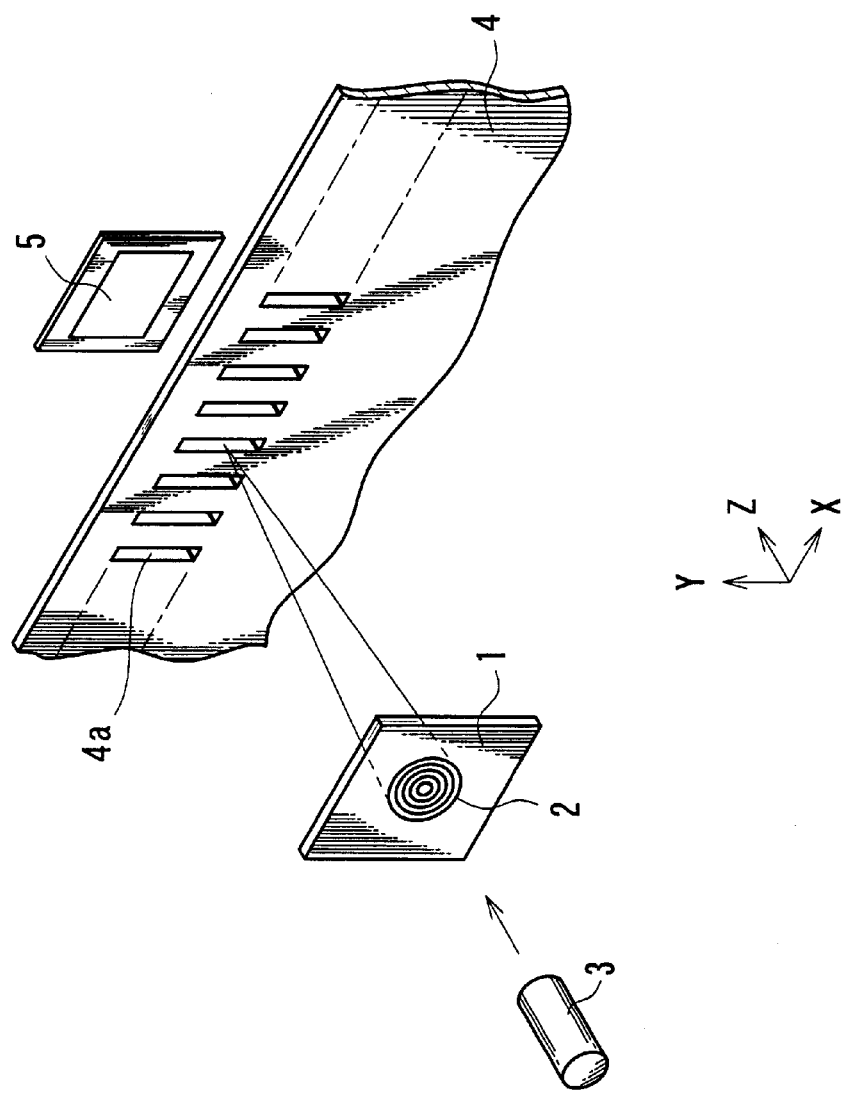
FIG. 3 is a perspective view showing a construction of an optical rotary encoder in a second embodiment of the present invention.

FIG. 3 is a perspective view showing an optical rotary encoder having one zone plate as a second embodiment of the present invention. This embodiment has the construction same as the first embodiment except for that the stationary plate 1 includes only one zone plate 2 and that the light receiving element has a reduced dimension with respect to the X-direction in correspondence to the dimension of the zone plate 2.

In a construction such as mentioned above, a limited quantity of light results in a slightly difficult detection by the light receiving element 5. Yet, this embodiment can offer a rotary encoder featuring high-precision detection like that offered by the first embodiment of the invention.

Figure 4:
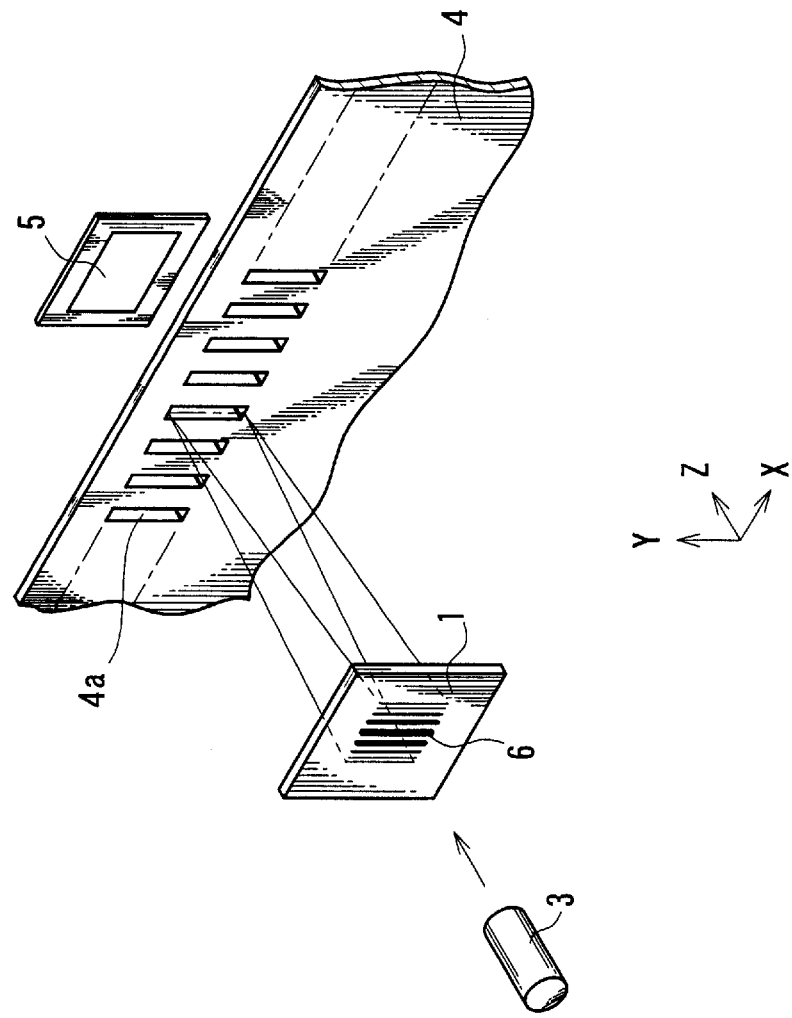
FIG. 4 is a perspective view showing a construction of an optical rotary encoder in a third embodiment of the present invention.
Figure 5:
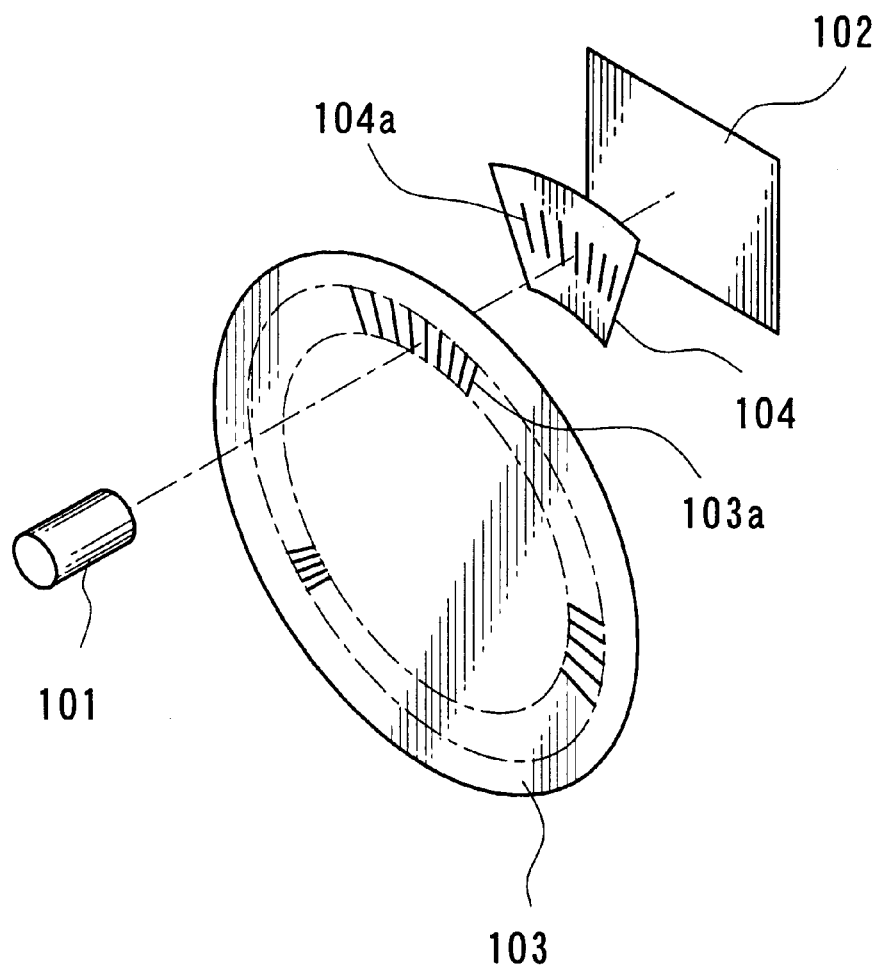
FIG. 5 is a perspective view showing a construction of the conventional optical rotary encoder.

FIG. 4 is a perspective view showing a third embodiment of the invention. In this embodiment, a linear zone plate 6 is provided instead of the concentrically formed zone plate 2 of the second embodiment. More specifically, the linear zone plate 6 is formed with linear zones extended in parallel with a longitudinal direction (Y-direction) of the slit 4a positioned on the optical axis. In this case, the LED light is converged on a line extended in the Y-direction. Therefore, even if the slit 4a is displaced in the Y-direction, the light receiving element 5 is allowed for the detection as long as at least a part of the linearly converged LED light passes through the slit 4a.

Incidentally, it is also possible to include a plurality of linear zone plates 6 into this third embodiment, similarly to the first embodiment.

What is claimed is:

1. An optical rotary encoder comprising:

a light source;

a stationary plate disposed perpendicular to an optical axis of light emitted from said light source, said stationary plate having at least one zone plate;

a rotary slit plate which is rotatable and spaced from said stationary plate by a focal length of said zone plate in a direction of emission of said light, said rotary slit plate having slits arranged at predetermined space intervals along a circumference at a radius position of intersection with said optical axis; and a light receiving element disposed proximate to said rotary slit plate for detection of light passing through said slits.

2. An optical rotary encoder as set forth in claim 1, wherein a plurality of said zone plates are formed as arranged in a direction that said slits are arranged, and a distance between centers of adjacent zone plates is expressed by an expression of n·Ls with Ls representing a space interval between adjacent two of said slits and n representing an integer.

3. An optical rotary encoder as set forth in claim 1, wherein said zone plate is a Fresnel zone plate in which a plurality of circular zones are concentrically formed.

4. An optical rotary encoder as set forth in claim 1, wherein said zone plate is a linear zone plate having a linear zone extended in parallel with a longitudinal direction of said slit positioned on said optical axis from the light source.

* * * * *